United States Patent [19]

Kennedy et al.

[11] Patent Number: 5,412,916
[45] Date of Patent: May 9, 1995

[54] STRUCTURE HAVING QUICK-CONNECT COMPONENTS

[75] Inventors: William R. Kennedy; John M. Kennedy, both of Taylorville, Ill.

[73] Assignee: Jack Kennedy Metal Products and Buildings Inc., Taylorville, Ill.

[21] Appl. No.: 88,910

[22] Filed: Jul. 8, 1993

Related U.S. Application Data

[63] Continuation of Ser. No. 854,369, Mar. 19, 1992, abandoned.

[51] Int. Cl.⁶ .............................................. E04B 1/343
[52] U.S. Cl. ........................................ 52/262; 52/79.5;
  52/270; 52/284; 405/132; 405/153
[58] Field of Search ................ 52/79.5, 284, 262, 270,
  52/271, 90.1, 91.1, 91.3, 592.1, 592.2, 592.3,
  592.6, 582.1, 584.1; 405/132, 150.1, 151, 153,
  288

[56] References Cited

U.S. PATENT DOCUMENTS

| | | |
|---|---|---|
| 1,923,008 | 8/1933 | Proctor . |
| 2,238,566 | 4/1941 | Perrine . |
| 2,264,100 | 11/1941 | Smith . |
| 2,333,908 | 11/1943 | Wilkoff . |
| 3,738,083 | 6/1973 | Shimano ................................. 52/271 |
| 3,820,294 | 6/1974 | Parker ................................... 52/271 |
| 4,621,951 | 11/1986 | Dewson . |
| 4,677,797 | 7/1987 | Roth ......................................... 52/94 |

FOREIGN PATENT DOCUMENTS

| | | | |
|---|---|---|---|
| 241008 | 10/1960 | Australia ............................ 52/582.1 |
| 183694 | 3/1955 | Austria . |
| 1382333 | 1/1975 | United Kingdom . |

Primary Examiner—Michael Safavi
Attorney, Agent, or Firm—Senniger, Powers, Leavitt & Roedel

[57] ABSTRACT

A structure including at least two generally parallel, spaced-apart side walls, and a plurality of roof panels extending between the side walls for forming the roof of the structure. Each roof panel has opposite ends overlying the upper ends of respective side walls. The roof panels and side walls are constructed with a bayonet connection device for quick connection.

18 Claims, 4 Drawing Sheets

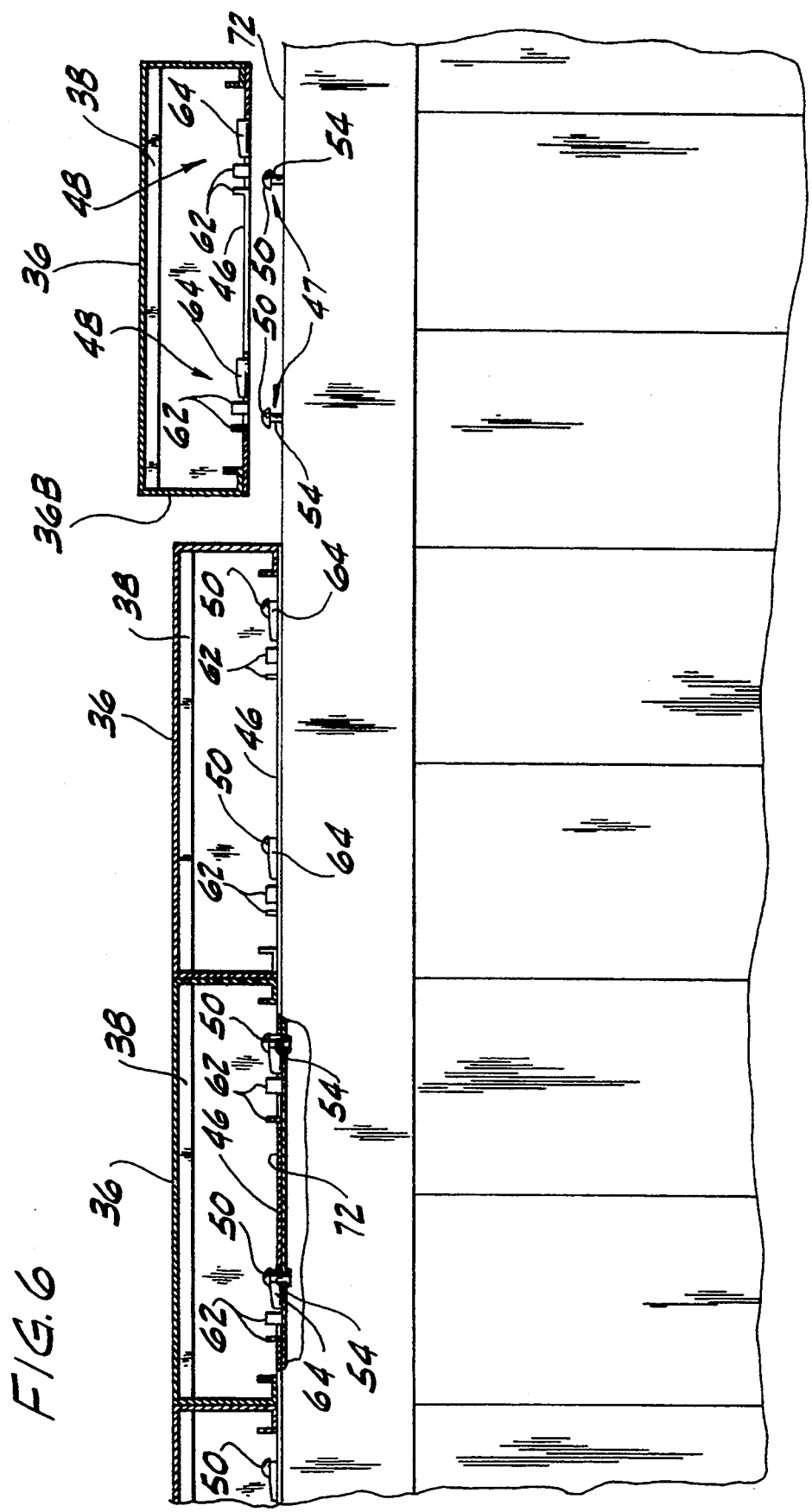

STRUCTURE HAVING QUICK-CONNECT COMPONENTS

This is a continuation of application Ser. No. 07/854,369, filed on Mar. 19, 1992, now abandoned.

BACKGROUND OF THE INVENTION

This invention relates generally to structures and more particularly to structures made up of roof and wall components which can be quickly secured together.

Structures which can be quickly assembled have many applications, but are particularly useful in underground mining operations where sturdy, but temporary structures are required. An example of such a structure is to a mine ventilation structure at the intersection of two mine passageways for separating the air flow in the two passageways. Such a structure is shown in co-assigned U.S. application Ser. No. 07/706,036, the disclosure of which is incorporated herein by reference. Quickly erectable structures have many other applications. Another example in the mining environment are freestanding, fire-proof structures which are required to enclose certain equipment (e.g., generators, battery chargers). The location of work in a mine changes with some frequency and it is necessary to move the structure. Therefore, it is desirable to have a structure which is sturdy, but which can be quickly erected and then later disassembled and taken to a new location in the mine.

With respect to co-pending application Ser. No. 07/706,036, the mine ventilation structure described therein can be assembled very quickly. However, after the deck or roof panels are placed on top of the side walls, the workmen must tie the roof panels together and/or secure the roof panels to the side walls using a number of fasteners. If, as frequently occurs, the structure is later taken down, all of the fasteners holding the roof panels together and/or onto the side walls must be individually removed before the roof panels can be taken down. Thus, there is presently a need for a structure capable of even more rapid assembly and disassembly.

SUMMARY OF THE INVENTION

Among the several objects and features of the present invention may be noted tile provision of a structure which can be quickly erected; tile provision of such a structure which can be disassembled quickly without destruction of its components for later erection in a new location; the provision of such a structure which minimizes use of separate fasteners; the provision of such a structure which is sturdy; and the provision of such a structure which is economical to manufacture and easy to use.

Generally, a structure made according to the principles of the present invention comprises at least two generally parallel, spaced-apart side walls and a plurality of roof panels adapted to extend between the side walls for forming the roof of the structure. Each roof panel has opposite ends generally overlying respective upper ends of the side walls. Bayonet connection means associated with the side walls and roof panels allows quick-connection of the roof panels to the side walls.

Other objects and features of the present invention will be in part apparent and in part pointed out hereinafter.

BRIEF DESCRIPTION OF THE DRAWINGS

FIG. 6 is a fragmentary elevation of one of the structure adjacent the upper end thereof as indicated by line 6—6 of FIG. 1.

Corresponding reference characters indicate corresponding parts throughout the several views of the drawings.

DETAILED DESCRIPTION OF THE PREFERRED EMBODIMENTS

Figure 1:
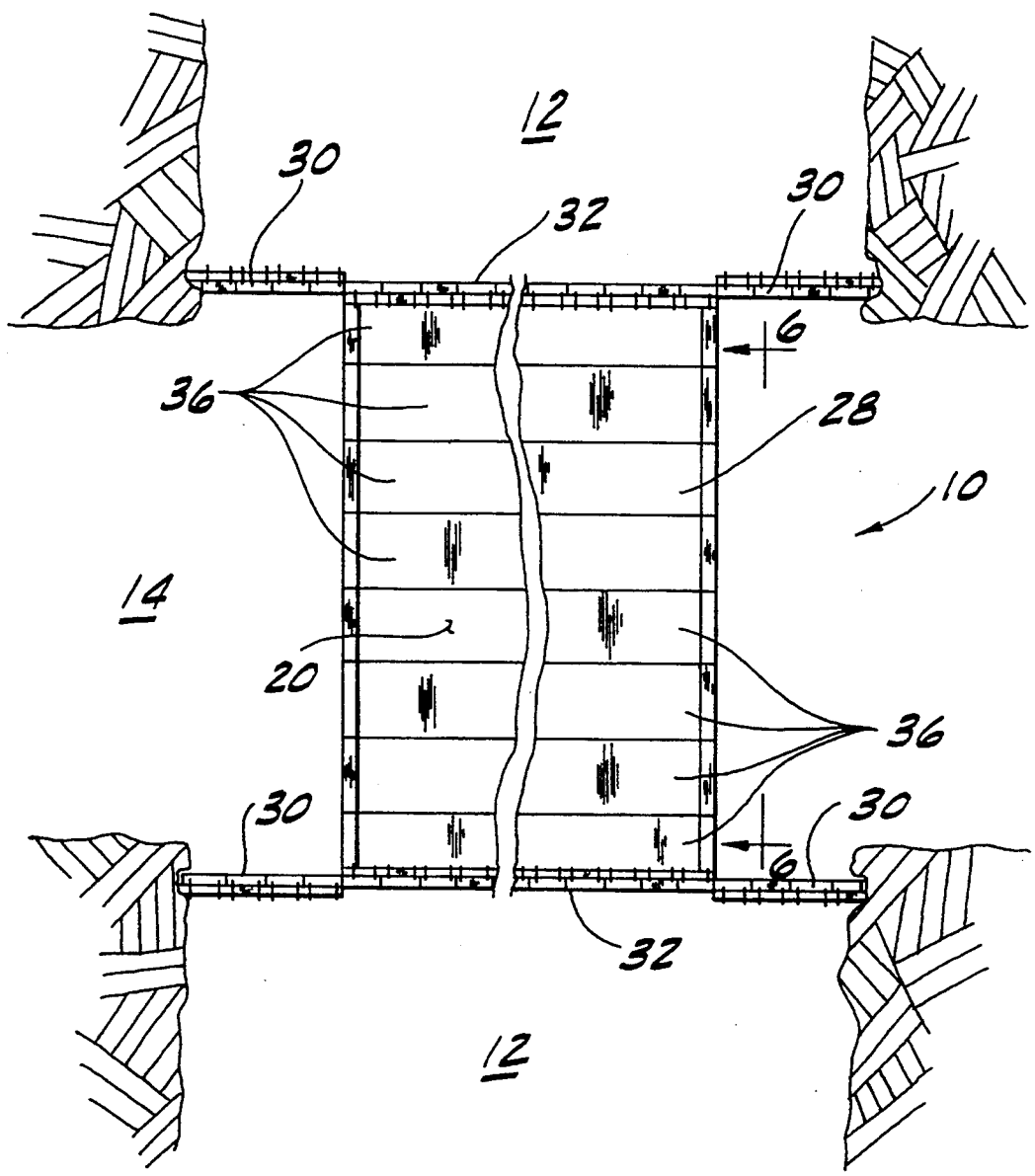
FIG. 1 is a top plan of a structure of the present invention shown installed at the intersection of two mine passageways.

Referring now to the drawings, and particularly to FIG. 1, a structure of the present invention is shown in the form of a mine ventilation structure 10 erected at the intersection of two mine passageways, designated 12 and 14, respectively, for keeping separate the air flows in the two passageways. The structure 10 defines a first passage or "tunnel" 18 extending through the intersection and communicating at its ends with passageway 12. The structure allows air in the second passageway 14 to flow through the intersection over the tunnel 18 in a second passage or "tunnel" 20 defined by the space between the roof of the structure and the ceiling of the mine. The structure 10 is made of relatively lightweight component parts, which may be transported into the mine for assembly at the intersection of the passageways. It is to be understood that the structure of the present invention, including particularly its feature for quick connection and release, is useful for many other applications, such as a freestanding building for enclosing equipment in the mine. In that case, the structure is enclosed by a front wall and a back wall (not shown).

The structure 10 includes a pair of generally parallel, spaced-apart walls, generally indicated at 22, extending upwardly from the floor of the mine and defining side walls of the structure. The side walls 22 are constructed from a plurality of elongate, vertically oriented sheet metal side wall panels 24 secured together in closely adjacent side-by-side relation. A roof indicated generally at 28 extends between the upper ends of the side walls 22. Wing panels 30 located at each end of the tunnel extend between the side walls 22 and the walls of the first passageway 12 and end panels 32 located at each end of the tunnel extend between the roof 28 and the ceiling of the first passageway. The wing panels 30 and the end panels 32 are of the type described in U.S. Pat. No. 4,483,642 (incorporated herein by reference) as having telescoping sections that may be extended and retracted to selectively adjust the height of the panels according to the vertical dimension of the first passageway.

The roof 28 is formed from a plurality of roof panels 36 extending between the side walls 22 of the structure. As assembled to form the roof, the roof panels 36 are located close together in side-by-side arrangement to close the top of the structure 10. Each roof panel 36 comprises a sheet metal panel generally of inverted channel shape in transverse cross section having an upper web 36A and side flanges 36B extending down from the web at opposite sides of the web. The roof panels 36 support their own weight, as well as the load caused by persons on the roof 28 and debris which falls from the mine ceiling onto the roof. To strengthen the web, angle irons 38 extending transversely of the roof panels 36 between the side flanges 36B are attached as by welding to the underside of the web 36A of the roof panels at locations spaced longitudinally of the roof panels. The side flanges 36D are stiffened by inwardly turned lips 36C at the bottom edges of the side flanges. The lips 36C extend the length of the side flanges 36B, and the free edge margin 36D of each lip is turned upwardly. Each roof panel 36 is closed at its end by an integral end cap, generally indicated at 42, comprising a vertical portion 44 attached, as by welding, to the end of the roof panel, and a horizontal portion 46 projecting inwardly from the bottom edge margin of the vertical portion and attached, as by welding, to the underside of the lips 36C.

Bayonet connection means associated with the side walls 22 and roof panels 36 for bayonet connection of the roof panels to the side walls includes first connector means, generally indicated at 47, associated with the side walls 22, and second connector means, generally indicated at 48, associated with the roof panels adjacent opposite ends thereof. In the preferred embodiment, connector means 47 comprises a plurality of pins 50 projecting upwardly from the tops of the side walls 22, and means 48 comprises a plurality of generally keyhole-shaped slots, indicated generally at 52, formed in the horizontal portions 46 of the end caps 42. It is to be understood that the slots 52 could be associated with the side walls 22 and the pins 50 with the roof panels 36 and still fall within the scope of the present invention.

Each pin 50 has an upwardly projecting shank 54 and a head 56 at the top of the shank having a larger diameter D1 than the shank. Each slot 52 includes a first relatively wide portion 58 sized for receiving the head 56 and shank 54 from a first direction (indicated by arrow 57 in FIG. 2), and a second narrower portion 60 contiguous with the first portion and sized for receiving the shank as the pin 50 is moved in a second direction (indicated by arrow 61 in FIG. 2) generally perpendicular to the first direction. The narrower portion 60 is sized smaller than the head 56 to prevent withdrawal of the pin 50 from the slot 52 by movement in a third direction (indicated by arrow 63 in FIG. 2) opposite the first direction.

Figure 3:
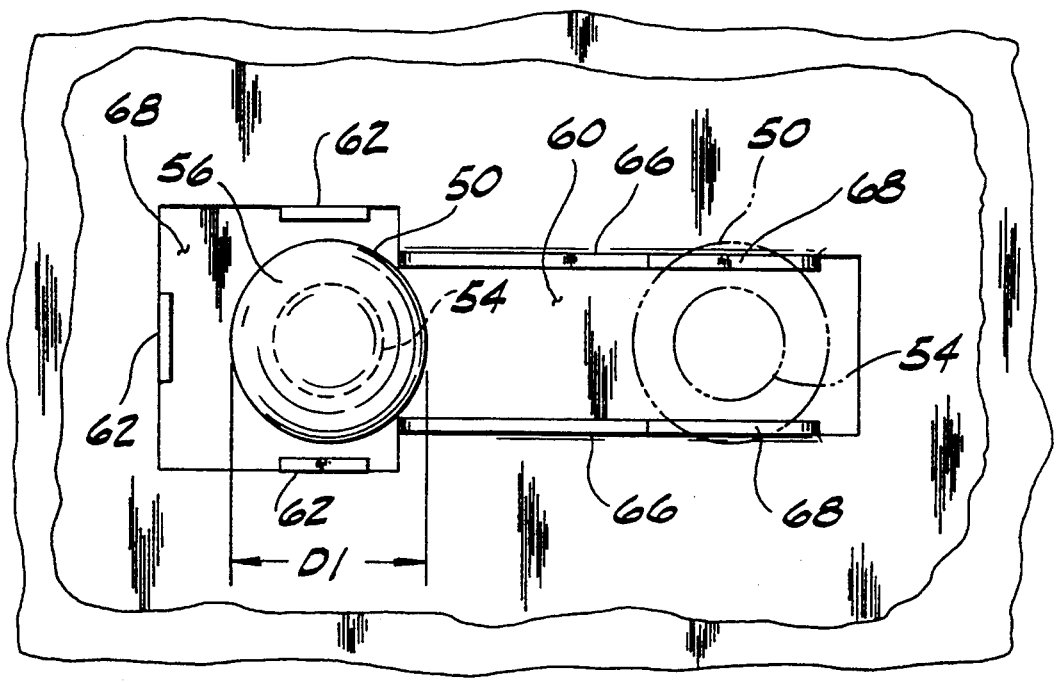
FIG. 3 is an enlarged fragmentary horizontal section showing a slot in one of the roof panels receiving a pin on one of the sidewalls for connecting the roof panel to the side wall.
Figure 4:
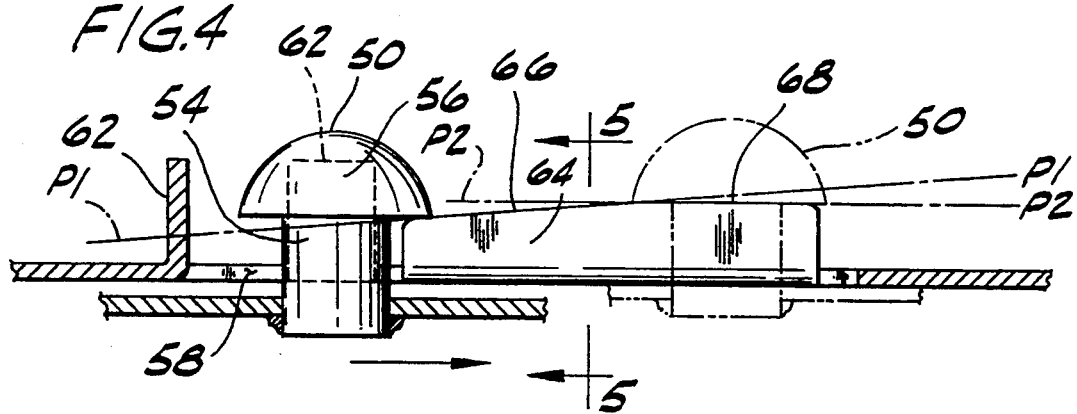
FIG. 4 is an enlarged fragmentary vertical section corresponding to FIG. 3.

As shown in FIGS. 3 and 4, a plurality of tabs 62 (broadly "retainer means") are formed integrally with the horizontal portion 46 of each roof panel end cap 42. The tabs project upwardly out of the plane of the slot 52 generally at the perimeter of its wide portion 58 and same to retain the head 56 of the pin within the perimeter of this portion of the slot upon insertion therein. One of the tabs 62 is located on each of three sides of the generally square portion 58. The fourth side of the slot portion 58 opens to the narrower portion 60 of the slot. The tabs 62 facilitate withdrawal of the pin 50 from the slot 52 upon disassembly of the structure 10 by preventing the head 56 of the pin from catching on the horizontal portion 46 of the end cap 42 surrounding the wide portion 58 of the slot.

Figure 5:
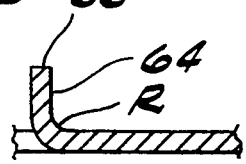
FIG. 5 is an enlarged fragmentary section taken in the plane including line 5—5 of FIG. 4.

A pair of ramps 64 (broadly "pulling means"), one disposed along each of the two longitudinal edges of the narrower portion 60 of the slot 52, are integrally formed from the horizontal portion 46 of the end cap 42 and project upwardly from the horizontal portion. As shown in FIG. 5, the ramps 64 are formed with a radius bend R. Upwardly facing ramp surfaces 66 lie generally in a plane P1 intersecting the plane of the horizontal portion 46 of the end cap. The plane P1 of the ramp surfaces 66 slopes upwardly away from the wide portion 58 of the slot. Thus, the vertical spacing between the sloped ramp surfaces and the horizontal portion 46 of the end cap is at a minimum at the ends of the ramp surfaces adjacent portion 58 of the slot and at a maximum at the opposite ends of the ramp surfaces. At the ends of the sloped ramp surfaces 66 opposite the wide portion 58 of the slot are ramp surfaces 68 lying in a generally horizontal plane P2 parallel to the plane of the horizontal portion 46 of the end cap.

When a pin 50 is moved into the narrower portion 60 of its respective slot 52 by movement in the second direction 61 lying in a plane parallel to the plane of the horizontal portion 46 of the end cap, the underside of the head 56 engages the ramp surfaces 66 so that as the pin is moved further into the narrower portion of the slot the ramps pull the pin further through the slot to bring the roof panel 36 into secure engagement with the side wall 22. This action is illustrated in FIG. 4, where the pin 50 is shown in phantom as fully inserted into the narrower portion 60 of the slot. In this fully interlocked position, the pin head 56 rests on the horizontal ramp surfaces 68 so that the pins do not tend to slide back down the ramps 64 because of the tension on the pins. The ramps 64 compensate for dimensional tolerances in different pins 50 and ramps by deforming inwardly in response to forces applied by the pin as it slides up the ramp surfaces 66, so that the roof panel 36 is drawn into tight engagement with the side wall 22. The radius R allows the ramps 64 to flex without being permanently deformed or fracturing. However, the ramps 64 may be somewhat plastically deformed and still fall within the scope of the present invention. Thus, a close fit between the roof panel 36 and side wall 22 is achieved, and the structure 10 may be easily sealed.

Figure 2:
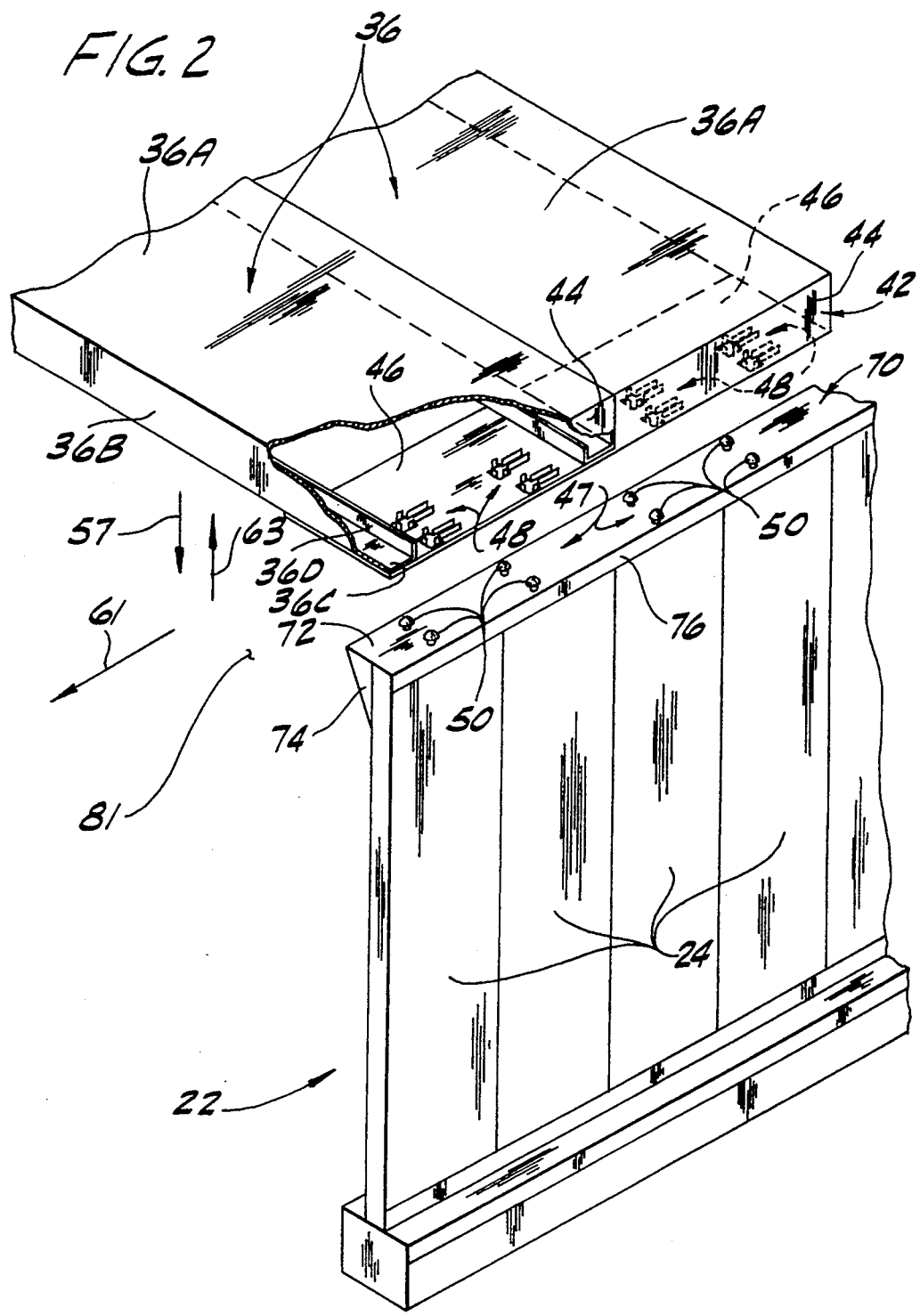
FIG. 2 is a fragmentary exploded perspective of a side wall and roof of the structure.

Referring now to FIG. 2, the upstanding pins 50 are formed on shelf members, indicated generally at 70, at the upper ends of the side walls 22. The shelf members 70 each include a top shelf 72 located at the top of the side wall 22. These shelf members are wider than the side wall so that they project laterally inwardly from the side wall. Each shelf member 70 has a plurality of gussets 74 which engage the top shelf 72 and the inside of the side wall to support the overhanging portion of the top shelf. The opposite longitudinal edge margin of the top shelf 72 is formed with a downwardly turned lip 76 engageable with the outside of the side wall 22 for locating the shelf member 70 on the side wall. The top shelf 72 is sized so that the shelf member 70 may also be used with wider masonry side walls, which are commonly used in mine structures.

Thus it may be seen that the several objects of the invention are arraigned and other advantageous results achieved by the structure 10 of the present invention. More specifically, the structure can be quickly erected by constructing opposing side walls 22 either from masonry (not shown) or from steel wall panels 24 (as shown herein). The roof panels 36 can be quickly secured on the side walls 22 in close side-by-side relation by lifting them to a position in which the ends of the roof panels are above the side walls, and lowering the roof panels in the first direction 57 along a generally vertical line lying in a plane parallel to the planes of the side walls toward the upper ends of the side walls. The workmen manipulate the roof panel 36 so that the slots 52 in the end caps 42 of the roof panels are generally aligned with the pins 50 on the side walls so that each pin is received through a corresponding wide portion 58 of the slot, for interengaging the pin 50 and the slot 52.

By moving the roof panels 36 in the second direction 61 along a generally horizontal line lying in a vertical plane parallel to the plane of the side walls 22, the shank 54 of the pin passes from the wide portion 58 of the slot into the narrower portion 60 and the underside of the pin head 56 engages the ramp surfaces 66. Once inserted into the narrower portion 60 of the slot, the pin 50 may not be withdrawn from the slot 52 by upward movement of the roof panel in the stated third vertical direction 63 opposite the first direction 57. As the pin 50 progresses further into the narrower portion 60 of the slot, it is drawn further through the slot by the ramps 64 so that the roof panel 36 is interlocked with the side wall 22, as shown in phantom in FIGS. 3 and 4. This facilitates the construction of a structure 10 which is sturdy and in which each roof panel 36 is held securely against the top shelf 72 and against the adjacent roof panel. The ramps 64 may flex inwardly toward the shank 54 as the pin slides along the ramp surfaces 66 so that a secure fit is achieved despite dimensional variations between different pins and ramps. Moreover, sealing of the structure 10 is facilitated because there are very few gaps between the roof panels 36 and the side walls 22, and because adjacent roof panels are located in a tight side-by-side engagement.

Construction of the roof 28 is accomplished by first attaching a roof panel 36 at the near ends of the side walls 22, as seen in FIG. 2, and then connecting an adjacent roof panel. Construction continues by connecting the next adjacent roof panel 36, and so on until the roof 28 is completed to the far ends of the side walls 22. This order of construction is necessary in this embodiment of the invention so that each roof panel 36 will have room to slide along the walls into its locked position closely adjacent the previously attached panel. However, connecting means not requiring this order of assembly still falls within the scope of the present invention.

The structure 10 of the present invention may also be quickly disassembled. More particularly, the roof panels 36 may be removed from the side walls 22 by sliding the roof panel so that the pin 50 moves out of the narrower portion 60 of the slot back into the wide portion 58. Of course, in the illustrated embodiment disassembly of the roof panels 36 from the side walls 22 begins at the ends of the side walls opposite those at which assembly began. The retainer tabs 62 engage the head 56 of each pin and prevent it from becoming hung up on the horizontal portion 46 of the end cap 42 so that the roof panel may then be easily raised off the side wall without the pin heads catching on the horizontal portion. The structure 10 may then be further broken down and removed to a new site in the mine where it can be reassembled.

As various changes could be made in the above constructions without departing from the scope of the invention, it is intended that all matter contained in the above description or shown in the accompanying drawings shall be interpreted as illustrative and not in a limiting sense.

What is claimed is:

1. An underground mine structure comprising:
    at least two generally parallel, space-apart side walls;
    a plurality of roof panels extending between the side walls and forming the roof of the structure, each roof panel having opposite ends overlying the upper ends of respective side walls;
    bayonet connection means associated with the side walls and the roof panels forming a bayonet connection of the roof panels to the side walls, said bayonet connection means comprising first connector means associated with the side walls and second connector means associated with the roof panels, said first and second connector means interengaged by movement relative to one another in a first generally vertical direction, and releasably interlocked by movement relative to one another in a second generally horizontal direction generally perpendicular to said first direction;
    said second connector means comprising pulling means engageable by said first connector means for drawing the roof panel down and into engagement with the top of a respective side wall upon said generally horizontal movement of said first connector means relative to said second connector means thereby to releasably secure the roof panel to the side walls;
    said first connector means comprising a plurality of pins disposed at the top of each side wall, and projecting generally upward from the top of the side wall, and said second connector means further comprising a plurality of slot sin each end of the roof panels, each slot including a first portion opening generally downwardly for receiving a respective pin upon downward movement of the roof panel toward the tops of the side walls in the first generally vertical direction, and a second portion sized for receiving the pin upon movement of the roof panel in the second generally horizontal direction relative to the side walls, each pin being received in said second portion of a respective slot, said second portion of the slot being sized for preventing withdrawal of the pin from the slot by movement in a third generally vertical direction opposite said first direction.

2. A structure as set forth in claim 1 wherein said pulling means comprises ramp means extending along said second portion of the slot, said ramp means being engageable with the pins for drawing the pins further into the slot.

3. A structure as set forth in claim 2 wherein said ramp means comprises two ramps, one on each of two opposing sides of said second portion of the slot, each ramp having a ramp surface adapted to engage the pin and each ramp being adapted to deform inwardly in response to force exerted by the pin, the ramp surfaces lying in a plane sloping upwardly away from said first portion of the slot.

4. A structure as set forth in claim 1 wherein each pin comprises a shank and a head, the shank having a smaller diameter than the head, the first portion of the slot being large enough to admit the shank and the head of the pin therein, and the second portion of the slot being large enough to admit the shank therein but too small to admit the head.

5. A structure as set forth in claim 4 further comprising retainer means for retaining the pin head within the perimeter of the first portion of the slot.

6. A structure as set forth in claim 5 wherein said retainer means comprises the tabs projecting out of the plane of the first portion of the slot generally at the perimeter of the first portion of the slot, the tabs being adapted for engagement with the head of the pin for retaining the pin head within the perimeter of the first portion but permitting passage of the pin out of the first portion into the second portion of the slot.

7. An underground mine structure comprising:
at least two generally parallel, spaced-apart side walls;
a plurality of roof panels extending between the side walls and forming the roof of the structure, each roof panel having opposite ends overlying the tops of respective side walls;
bayonet connection means associated with the side walls and the roof panels forming a bayonet connection of the roof panels to the side walls, said bayonet connection means comprising pulling means for drawing each of the roof panels into engagement with the tops of the side walls as the roof panel is connected to the side walls, and for thereafter holding the roof panel in engagement with the tops of the side walls;
said bayonet connection means further comprising a plurality of pins associated with the roof panels and a plurality of slots associated with the side walls, each pin being received in a corresponding slot for bayonet connection therein, and wherein said pulling means comprises ramp means extending along each slot, said ramp means being engageable with the pin after insertion of the pin into the slot for drawing the pin further into the slot, thereby pulling a respective roof panel toward the top of a respective side wall.

8. A structure as set forth in claim 7 wherein said ramp means comprises two ramps, one on each of the two opposing sides of the slot, each ramp having a ramp surface engageable with the pin and each ramp being adapted to deform inwardly in response to force exerted by the pin, the ramp surfaces lying in a plane sloping upwardly away from a plane including the slot.

9. A structure as set forth in claim 8 wherein each pin has a shank and a head, the shank having a smaller diameter than the head, and wherein each slot comprises a first portion sized for receiving the shank and the head of the pin inserted from a first direction, and a second portion sized for receiving the shank moving from the first portion in a second direction generally perpendicular to said first direction and for preventing withdrawal of the pin from the slot by movement relative to the slot in a third direction opposite said first direction.

10. A structure as set forth in claim 9 further comprising retainer means for retaining the pin within the perimeter of the first portion of the slot.

11. A structure as set forth in claim 10 wherein said retainer means comprises the tabs projecting out of the plane of the first portion of the slot generally at the perimeter of the first portion of the slot, the tabs being adapted for engagement with the head of the pin for retaining the pin head within the perimeter of the first portion.

12. An underground mining structure comprising:
at least two generally parallel, spaced-apart side walls;
a plurality of roof panels extending between the side walls and forming the roof of the structure, each roof panel having opposite ends overlying the upper ends of respective side walls;
bayonet connection means associated with the side walls and the roof panels forming a bayonet connection of the roof panels to the side walls, said bayonet connection means comprising first connector means associated with one of the side walls and roof panels, and second connector means associated with the other of the side walls and the roof panels, said first and second connector means interengaged by movement relative to one another in a first vertical direction, and releasably interlocked by movement relative to one another in a second direction;
said first connector means comprising a plurality of pins, and said second connector means comprising a plurality of slots, each slot including a first portion sized for receiving a respective pin extending along a generally vertical line from said one of the side walls and the roof panels, said first portion lying in a generally horizontal plane to receive the pin upon downward movement of the roof panel toward the tops of the side walls in the first direction, and a second portion sized for receiving the pin upon movement of the roof panels in the second direction relative to the side walls, each pin being receive din said second portion of a respective slot, said second portion of the slot being sized for preventing withdrawal of the pin from the slot by movement in a third generally vertical direction opposite said first direction.

13. A structure as set forth in claim 12 wherein said second connector means comprises pulling means engageable by said first connector means for drawing the roof panel down and into engagement with the top of a respective side wall upon movement of said first connector means relative to said second connector means in said second direction thereby to releasably secure the roof panel to the side walls.

14. A structure as set forth in claim 13 wherein said pulling means comprises ramp means extending along said second portion of the slot, said ramp means being engageable with the pins for drawing the pins further into the slot.

15. A structure as set forth in claim 14 wherein said ramp means comprises two ramps, one on each of two opposing sides of said second portion of the slot, each ramp having a ramp surface adapted to engage the pin and each ramp being adapted to deform inwardly in response to force exerted by the pin, the ramp surfaces lying in a plane sloping upwardly away from said first portion of the slot.

16. A structure as set forth in claim 12 wherein each pin comprises a shank and a head, the shank having a smaller diameter than the head, said first portion of the slot being large enough to admit the shank and the head of the pin therein, and said second portion of the slot being large enough to admit the shank therein but too small to admit the head.

17. A structure as set forth in claim 16 further comprising retainer means for retaining the pin head within the perimeter of said first portion of the slot.

18. A structure as set forth in claim 17 wherein said retainer means comprises tabs projecting out of the plane of said first portion of the slot generally at the perimeter of said first portion of the slot, the tabs being adapted for engagement with the head of the pin for retaining the pin head within the perimeter of the first portion but permitting passage of the pin out of said first portion into said second portion of the slot.

* * * * *